United States Patent Office 3,557,225
Patented Jan. 19, 1971

3,557,225
STORAGE OF DIENES
Donald H. Kubicek, Bartlesville, Okla., assignor to Phillips Petroleum Company, a corporation of Delaware
No Drawing. Filed Feb. 17, 1969, Ser. No. 799,994
Int. Cl. B01j 1/16; C07c 7/18; C09k 3/00
U.S. Cl. 260—666.5                                11 Claims

ABSTRACT OF THE DISCLOSURE

A diene is admixed with 0.1 to 3 percent of a nickel complex, the mixture is stored in the presence of oxygen and the diene product is recovered from storage. The nickel complex prevents formation of dangerous amounts of oxygenated compounds during storage.

---

Dienes are utilized extensively in the chemical and petroleum industries and, consequently, must be stored for short or extended periods of time. Where oxygen is present in the storage vessel, there is a substantial danger that peroxides and other oxygenated compounds may be formed, some of which are violently explosive.

I have discovered that formation of the oxygenated compounds with resultant explosion hazards can be eliminated or minimized to a safe degree by incorporating 0.1 to 3 weight percent of certain nickel complexes in the diene to be stored. After storage for an extended period, the diene material contains less than 5 parts per million of peroxides, thus effectively eliminating explosion hazards.

The nickel complexes of the invention are non-volatile and, hence, can be readily separated when the stored diene is removed for use in a polymerization process or for other purposes. This can be effected simply by washing or distillation. Moreover, being hydrocarbon soluble, the nickel complexes can be incorporated into the diene by simple mixing. Thus, the use of the nickel complexes of the invention is advantageous compared to phenolic type inhibitors previously utilized for diene stabilization. Such phenolic type inhibitors are removed only with difficulty from the diene and frequently interfere with subsequent polymerization or other reactions.

The nickel complexes also function to prevent the formation of polymeric oxygen-containing compounds, because the precursors of such polymers are prevented from forming by the action of the nickel complex. It is believed that these precursors include furan, acrolein, butadiene peroxide, formaldehyde and other oxygenated compounds and peroxides. Such materials, particularly butadiene peroxide, are violently explosive and are insoluble in the diene. They are also capable of polymerizing to form oxygenated material of higher molecular weight.

The action of my nickel complexes in preventing the formation of such high molecular weight oxygenated compounds is to be distinguished from other types of butadiene polymerization which apparently operate by different mechanisms. Thus, polymerization of dienes to form "popcorn" polymer is initiated by peroxides and occurs in the absence of oxygen. It is a free radical type polymerization yielding a highly branched polymer, but the presence of oxygen destroys the free radicals and thus prevents formation of popcorn polymer. With oxygen present, there is thus no purpose in employing the usual popcorn polymer inhibitors, such as hydroquinone.

Neither is the formation of high moleculer weight oxygenated compounds related to the polymerization of olefins to form dimers or linear polymers, for example, by catalysts with organo-metal compounds. It has been proposed to inhibit the polymerization of olefins or diolefins to long chain linear polymers by the use of cyclopentadienyl nickel compounds. Such polymerizations are, as a practical matter, carried out in the absence of oxygen.

Each cyclopentadienyl group in such complexes takes up sufficient valence electrons in the nickel that it becomes a zero valent or at best a monovalent radical. The complexes of the present invention are distinguished by having two ionic bonds. They are also distinguished in function in that their action is to prevent the formation of dangerous oxygenated compounds in the presence of oxygen whereas the cyclopentadienyl compounds function in the absence of oxygen to inhibit linear polymerization.

The nickel complexes of the invention are characterized by the formula

wherein L is a ligand of the class $R_3P\rightarrow$, $R_3Sb\rightarrow$, $R_3As\rightarrow$, $R_3N\rightarrow$, $R_2O\rightarrow$, $R_3PO\rightarrow$, $R_3AsO\rightarrow$ and $R_2S\rightarrow$, R is hydrogen or an aryl, alkyl, aralkyl or alkaryl radical having 20 or less carbon atoms; X is an anion or charged moiety ionically bonded to the nickel atom; the arrows represent coordination bonds; and the molecule contains 4 to 75 carbon atoms.

It will be noted that the nickel atom in the above formula has two ionic bonds shared with the anion designated by the letter X. These anions can be halogens or any of a variety of other anions or charged moieties such as phosphate, nitrate, cyanide, carbonate, acetylacetonate, molybdate, chloride, bromide, $C_2H_5O^-$, $SCN^-$, $C_6H_5O^-$, $CH_3COO^-$, and $NH_2CH_2CH_2S^-$.

An important group of stabilizers according to the invention is represented by the formula

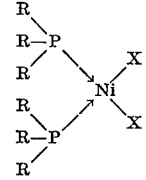

A specific compound of this group which gives outstanding results in the stabilization of dienes is bis(triphenylphosphine)dichloronickel.

Entirely analogous types of compounds are defined and embraced within the scope of the invention where other ligands shown in the general formula are utilized instead of the ligand $R_3P\rightarrow$.

Specific examples of the nickel complexes discussed above are bis(triphenylphosphine)dichloronickel, bis(eicosyldioctylphosphine)diacetatonickel, bis(tributylstibine)dichloronickel, bis(trimethylstibine)dicyanonickel, bis(tricyclohexylphosphine oxide)dibromonickel, bis(tridecylphosphine oxide)difluoronickel, bis(methyldiphenylarsine oxide)diiodonickel, bis(triethylarsine oxide)diethylatonickel, bis(dibenzylamino)dichloronickel, bis(diethylamino)dibromonickel, bis(trimethylamino)dibromonickel, bis(tripentadecylamino)diiodonickel, and bis(dibutyl sulfide)dibromonickel.

It will be understood that the anions X in the general formula can form a part of the structure of one or more of the aryl, alkyl, aralkyl or alkaryl radicals denoted by the letters R.

An important group of such complexes is represented by the formula

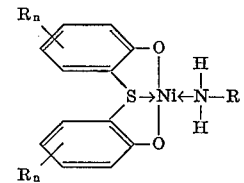

This is a specific example wherein the ligand is $R_2S \rightarrow$, R is the same as previously defined, and $n$ is zero to four.

Specific examples of this group are nickel cyclohexylamine complex salt of o,o'-thiobis(3,4,5-trimethylphenol), and the nickel butylamine complex salt of o,o'-thiobis(p-1,1,3,3-tetramethylbutylphenol), also known as 2,2' - thiobis[(4-1,1,3,3-tetramethylbutyl)phenyl]ato(2-)(butylamine)nickel.

Another group of applicable complexes is represented by the formula

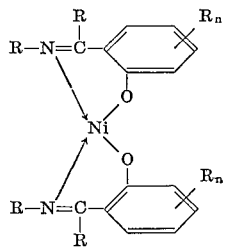

Specific examples of these compounds are the complex nickel salt of N - salicylidene-4-methylcyclohexylamine and the complex nickel salt of N-salicylidene-3-eicosylcyclopentylamine.

Specific examples of other types of complexes which are suitable as stabilizers in practicing the invention are the complex nickel salts of N-salicylidene-2-hydroxy-5-ethylaniline; N-[(2-hydroxyphenyl)(methyl)methylene]-2-hydroxy - 5 - isobutylaniline; 2-hydroxy-4-4'-didodecylbenzophenone; 2-hydroxy-4-methylbenzophenone; 5-t-octylsalicylaldehyde; 3,4,5,6 - tetramethylsalicylaldehyde; 4-benzylsalicylaldehyde; 3,4-di-t-butylsalicylaldehyde; 2,2'-dihydroxy-4-n-octylbenzophenone; 2,2'-dihydroxy-4-n-octadecylbenzophenone; 2-hydroxy-4-decyldiphenyl sulfide; and 2-hydroxy-3'-5'-dipropyldiphenyl sulfide.

Other specific examples are bis(N-tridecyl-$\beta$-mercaptoethylamine)nickel and bis[N,N - di(2 - ethylhexyl)-$\beta$-mercaptoethylamine]nickel.

In practicing the invention, 0.1 to 3 percent by weight of one or more of the defined nickel complexes is dissolved in the conjugated diene to be stored. Although there is no limit to the number of carbon atoms in the conjugated dienes which may be stabilized according to the invention, the explosion problem is most severe with those having 10 carbon atoms or less, for example, 1,3-butadiene, isoprene and 5-ethyloctadiene-1,3.

The mixture containing the dissolved complexing agent is stored for an extended period, which may be up to several days or longer, and is found to contain less than 5 parts per million peroxide during storage. Thereupon, the diene is removed from storage, and the stabilizing nickel complex is readily separated therefrom by washing or simple distillation. The diene is ready then for use in polymerization or other reactions.

It will be evident that I have provided a process for eliminating the explosion hazard encountered in storing conjugated dienes, and that the stabilizing processes of the invention can be simply and economically carried out due to the ease of incorporation of the stabilizing nickel complex into the diene and removal therefrom.

The invention is further illustrated by the following specific examples.

EXAMPLE I

Into a 3-ounce high-pressure Pyrex glass reactor was charged 0.4 g. bis(triphenylphosphine)dichloronickel, 15 ml. chlorobenzene, and 3.5 g. butadiene-1,3. The mixture was pressured with oxygen to 60 p.s.i.g. and heated to 100° C. at which temperature it was maintained for 7 hours. During this period there was no observable pressure drop and subsequent analysis of the mixture showed no detectable reaction with the oxygen.

This run demonstrated that even under severe conditions of temperature and oxygen pressure, no detectable deterioration of the butadiene took place.

EXAMPLE II

Into a 3-ounce high-pressure Pyrex glass reactor was charged 0.1 g. of [2,2'-thiobis[(4-1,1,3,3-tetramethylbutyl)phenyl]ato(2-)](butylamine)nickel, 40 ml. benzene, and 10 ml. butadiene. The reactor was pressured with oxygen to 114 p.s.i.g. A control run, which was essentially identical except that the nickel complex was omitted, was also carried out. These two mixtures were stirred at room temperature for about 6 days and then subjected to a sequence where the temperature was raised to 50° C. for about 8 hours and then reduced to room temperature for about 16 hours.

After about 13 days the pressure in the invention run was 107 p.s.i.g. while the pressure in the control was 75 p.s.i.g. Each was re-pressured to 120 p.s.i.g with oxygen. After 17 days the pressure was still 120 p.s.i.g. in the invention run but was only 80 p.s.i.g. in the control.

After 18 days, the test was concluded. Analysis of the control run showed the presence of about 23 p.p.m. peroxides. Analysis of the invention mixture, on the other hand, showed only about 2 p.p.m. which was near the limits of detectability. Further, gas-liquid chromatographic examination showed oxygenated materials in the control run while none were detected in the invention run.

EXAMPLE III

Into a similar reactor was charged 0.45 g. of the nickel phenolate complex of Example II, 15 ml. of chlorobenzene, and 3.5 g. of butadiene. The reactor was pressured with oxygen and heated so that the total pressure at 110° C. was 110 p.s.i.g. Heating and stirring was continued for 5 hours with no observable pressure drop although a brown discoloration slowly appeared. The mixture was then evaporated to dryness, leaving a residue of 0.49 g. indicating that little, if any, formation of non-volatiles had occurred even under the extremely severe conditions of this stability test.

Other variations and modifications of this invention will be apparent to those skilled in the art without departing from the spirit and scope of the invention.

I claim:

1. The method of storing a diene which comprises admixing with said diene 0.1 to 3 percent by weight of a nickel complex, storing the mixture in the presence of oxygen, and removing the diene from storage, whereby the stored diene contains less than 5 parts per million of oxygenated compounds, said nickel complex being characterized by the formula

wherein L is a ligand of the class $R_3P\rightarrow$, $R_3Sb\rightarrow$, $R_3As\rightarrow$, $R_3N\rightarrow$, $R_2O\rightarrow$, $R_3PO\rightarrow$, $R_3AsO\rightarrow$ and $R_2S\rightarrow$; R is hydrogen or an aryl, alkyl, araykyl or alkaryl radical having 20 or less carbon atoms; X is an anion or charged moiety ionically bonded to the nickel atom; the arrows represent coordination bonds; and the molecule contains 4 to 75 carbon atoms.

2. The method of claim 1 wherein the diene is conjugated and has 4 to 10 carbon atoms.

3. The method of claim 2 wherein the nickel complex contains 12 to 30 carbon atoms.

4. The method of claim 2 wherein the ligand is $R_3P\rightarrow$ and each R represents the same radical.

5. The method of claim 1 wherein the nickel complex is bis(triphenylphosphine)dichloronickel.

6. The method of claim 2 wherein the nickel complex has the formula

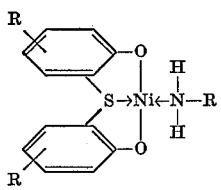

7. The method of claim 1 wherein the nickel complex is [2,2' - thiobis[(4-1,1,3,3 - tetramethylbutyl) phenyl]ato (2-)](butylamine) nickel.

8. The method of claim 4 wherein the nickel complex is removed from the diene by distillation or washing after the diene is removed from storage.

9. The method of claim 6 wherein the nickel complex is removed from the diene by distillation or washing after the diene is removed from storage.

10. The method of claim 5 wherein the diene is 1,3-butadiene.

11. The method of claim 7 wherein diene is 1,3-butadiene.

References Cited
UNITED STATES PATENTS

| | | | |
|---|---|---|---|
| 2,449,010 | 9/1948 | Robey et al. | 260—666.5 |
| 2,526,963 | 10/1950 | Morris | 203—6X |
| 2,950,237 | 8/1960 | Sharp | 204—158 |

DELBERT E. GANTZ, Primary Examiner

G. E. SCHMITKONS, Assistant Examiner

U.S. Cl. X.R.

203—9; 252—400; 260—681.5